US012275415B2

(12) United States Patent
Lei

(10) Patent No.: US 12,275,415 B2
(45) Date of Patent: Apr. 15, 2025

(54) DRIVING ASSISTANCE PROCESSING METHOD AND APPARATUS, COMPUTER-READABLE MEDIUM, AND ELECTRONIC DEVICE

(71) Applicant: TENCENT TECHNOLOGY (SHENZHEN) COMPANY LTD, Guangdong (CN)

(72) Inventor: Yixue Lei, Shenzhen (CN)

(73) Assignee: TENCENT TECHNOLOGY (SHENZHEN) COMPANY LTD, Shenzhen (CN)

( * ) Notice: Subject to any disclaimer, the term of this patent is extended or adjusted under 35 U.S.C. 154(b) by 231 days.

(21) Appl. No.: 17/989,977

(22) Filed: Nov. 18, 2022

(65) Prior Publication Data

US 2023/0091574 A1   Mar. 23, 2023

Related U.S. Application Data

(63) Continuation of application No. PCT/CN2021/137690, filed on Dec. 14, 2021.

(30) Foreign Application Priority Data

Apr. 30, 2021   (CN) .......................... 202110486420.5

(51) Int. Cl.
*B60W 50/00*   (2006.01)
*H04W 4/40*   (2018.01)
(52) U.S. Cl.
CPC .............. *B60W 50/00* (2013.01); *H04W 4/40* (2018.02); *B60W 2050/0062* (2013.01); *B60W 2556/45* (2020.02)
(58) Field of Classification Search
CPC ......... B60W 50/00; B60W 2050/0062; B60W 2556/45; B60W 30/14; B60W 2556/50;
(Continued)

(56) References Cited

U.S. PATENT DOCUMENTS 10,203,699 B1   2/2019 Kim et al.
2020/0169985 A1*   5/2020 Lei ......................... H04W 80/12
(Continued)

FOREIGN PATENT DOCUMENTS

CN   107331179 A   11/2017
CN   111210216 A   5/2020
(Continued)

OTHER PUBLICATIONS

English Translation of the Written Opinion of the International Searching Authority for PCT/CN2021/137690, all pages, filed into prosecution history on Oct. 23, 2023, https://patentscope.wipo.int/search/en/detail.jsf?docId=WO2022227593 (Year: 2023).*

(Continued)

*Primary Examiner* — Calvin Cheung
(74) *Attorney, Agent, or Firm* — Sughrue Mion, PLLC

(57) ABSTRACT

A driving assistance processing method performed by an electronic device disposed on a vehicle terminal, and includes generating an advanced driving assistance system (ADAS) enhancement service registration request including ADAS capability information of the vehicle terminal, sending the ADAS enhancement service registration request to the cloud platform based on information about a cloud platform that provides ADAS enhancement service, and receiving an ADAS enhancement service message from the cloud platform and corresponds to the ADAS capability information. The ADAS enhancement service registration request allowing the cloud platform to learn about the ADAS capability information of the vehicle terminal.

17 Claims, 6 Drawing Sheets

(58) Field of Classification Search
CPC ......... H04W 4/40; H04W 4/025; H04W 4/44;
H04W 4/027; H04L 67/51; H04L
41/0803; H04L 67/12; H04L 67/52
See application file for complete search history.

(56) References Cited

U.S. PATENT DOCUMENTS

| | | |
|---|---|---|
| 2020/0178124 A1* | 6/2020 | Lei ........................ H04W 28/24 |
| 2020/0287960 A1* | 9/2020 | Higuchi .............. H04L 67/1001 |
| 2021/0097780 A1 | 4/2021 | Aherne et al. |

FOREIGN PATENT DOCUMENTS

| | | |
|---|---|---|
| CN | 113162809 A | 7/2021 |
| WO | 2017/147007 A1 | 8/2017 |

OTHER PUBLICATIONS

WO 2017121123 A1 with English translation; date filed Aug. 29, 2016; date published Jul. 20, 2017. (Year: 2017).*
WO 2017101208 A1 with English translation; date filed Jan. 29, 2016; date published Jun. 22, 2017. (Year: 2017).*
Written Opinion for PCT/CN2021/137690, dated Mar. 3, 2022.
International Search Report for PCT/CN2021/137690, dated Mar. 3, 2022.

* cited by examiner

DRIVING ASSISTANCE PROCESSING METHOD AND APPARATUS, COMPUTER-READABLE MEDIUM, AND ELECTRONIC DEVICE

CROSS REFERENCE TO RELATED APPLICATIONS

This application is a continuation application of International Application No. PCT/CN2021/137690 filed on Dec. 14, 2021, which claims priority to Chinese Patent Application No. 202110486420.5 filed with the National Intellectual Property Administration, PRC on Apr. 30, 2021, the disclosures of each of which being incorporated by reference herein in their entireties.

FIELD

The disclosure relates to the field of computer and communication technologies, and specifically, to a driving assistance processing method and apparatus, a computer-readable medium, and an electronic device.

BACKGROUND

An advanced driving assistance system (ADAS) may sense a surrounding environment in real time using various sensors (e.g., a millimeter-wave radar, LIDAR, monocular or binocular camera and satellite navigation, and the like) installed on a vehicle. A driving process of the vehicle collects data, identifies, detects, and tracks stationary and moving objects, and performs a system operation and analysis, in combination with navigation map data, to enable a driver to recognize potential hazards in advance, thereby effectively increasing the comfort and safety of car driving.

However, a related art ADAS has the problem of a limited sensing range, and a more effective collaboration mechanism between multiple vehicles is lacking when a driving safety risk arises. Therefore, there are limitations in terms of safety.

SUMMARY

Embodiments of the present disclosure relate to a driving assistance processing method and apparatus, a computer-readable medium, and an electronic device, to improve the safety of an ADAS.

Other characteristics and advantages of this disclosure become apparent from the following detailed description, or may be learned in part through the practice of this disclosure.

According an aspect of one or more embodiments, a driving assistance processing method, performed by an electronic device disposed on a vehicle terminal, may include generating an advanced driving assistance system (ADAS) enhancement service registration request including ADAS capability information of the vehicle terminal; based on information about a cloud platform that provides an ADAS enhancement service, sending the ADAS enhancement service registration request to the cloud platform, the ADAS enhancement service registration request allowing the cloud platform to learn about the ADAS capability information of the vehicle terminal; and receiving an ADAS enhancement service message from the cloud platform and corresponds to the ADAS capability information.

According to other aspects of one or more embodiments, an apparatus and non-transitory computer readable medium consistent with the driving assistance processing method are also provided.

BRIEF DESCRIPTION OF THE DRAWINGS

To describe the technical solutions of example embodiments of this disclosure more clearly, the following briefly introduces the accompanying drawings for describing the example embodiments. The accompanying drawings herein, which are incorporated into the specification and constitute a part of this specification, show embodiments that conform to this disclosure, and are used for describing a principle of this disclosure together with this specification. Apparently, the accompanying drawings in the following description show merely some embodiments. In addition, one of ordinary skill would understand that aspects of example embodiments may be combined together or implemented alone.

DETAILED DESCRIPTION

Figure 1:
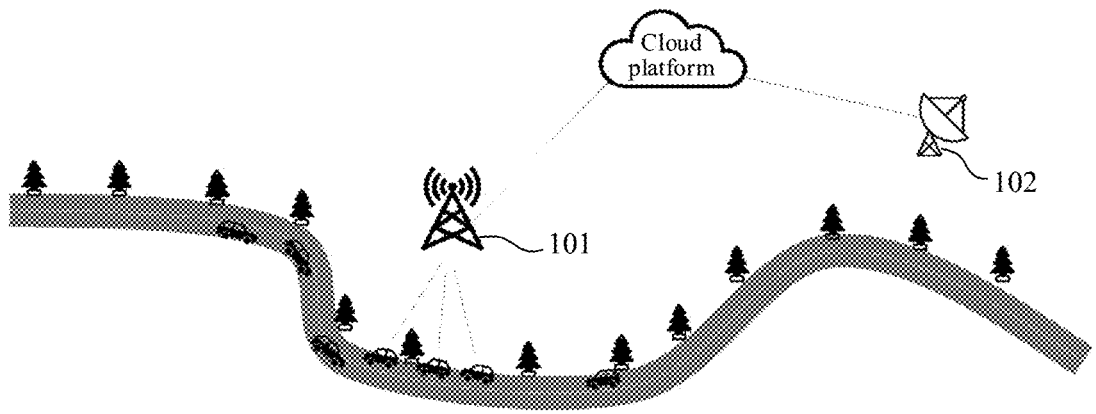
FIG. 1 is a schematic diagram of an application scenario according to some embodiments.

It is to be understood that the above general descriptions and the following detailed descriptions are merely for exemplary and explanatory purposes, and cannot limit this disclosure. Additional embodiments will be set forth in the description that follows and, in part, will be apparent from the description, and/or may be realized by practice of the presented embodiments of the disclosure.

Now, exemplary implementations are described comprehensively with reference to the accompanying drawings. However, the exemplary implementations may be implemented in various forms, and are not to be understood as being limited to the examples described herein. Instead, the implementations are provided to make this disclosure more thorough and complete and fully convey the idea of the exemplary implementations to a person skilled in the art.

In addition, the described features, structures, or characteristics may be combined in one or more embodiments in any appropriate manner. In the following descriptions, a lot of specific details are provided to give a full understanding of embodiments. However, a person skilled in the art is to be aware of that, the technical solutions according to embodiments may be implemented without one or more of the particular details, or other methods, unit, apparatus, or operation may be adopted. In other cases, well-known methods, apparatuses, implementations, or operations are not shown or described in detail, to avoid obscuring the aspects of this disclosure.

The block diagrams shown in the accompanying drawings is merely a functional entity and does not necessarily correspond to a physically independent entity. To be specific, such functional entities may be implemented in the form of software, or implemented in one or more hardware modules or integrated circuits, or implemented in different networks and/or processor apparatuses and/or microcontroller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

"Plurality of" mentioned in the specification means two or more. The term "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

As described above, embodiments of the present disclosure relate to a driving assistance processing method and apparatus, a computer-readable medium, and an electronic device, to improve the safety of an ADAS.

According some embodiments, a driving assistance processing method, performed by an electronic device disposed on a vehicle terminal, may include: generating an ADAS enhancement service registration request; in response to obtaining information about a cloud platform providing an ADAS enhancement service, sending the ADAS enhancement service registration request to the cloud platform, the ADAS enhancement service registration request being used for allowing the cloud platform to learn ADAS capability information of the vehicle terminal; and after the ADAS enhancement service is registered with the cloud platform, receiving an ADAS enhancement service message that is pushed by the cloud platform and corresponds to the ADAS capability information.

According to some embodiments, a driving assistance processing method, performed by an electronic device disposed on a cloud platform, may include: receiving an ADAS enhancement service registration request sent by a vehicle terminal, the ADAS enhancement service registration request being sent by the vehicle terminal after information about a cloud platform that provides an ADAS enhancement service is obtained; obtaining ADAS capability information of the vehicle terminal according to the ADAS enhancement service registration request; and pushing an ADAS enhancement service message corresponding to the ADAS capability information to the vehicle terminal according to the ADAS capability information of the vehicle terminal.

According some embodiments, a driving assistance processing apparatus may be provided, including: a processing unit, configured to generate an ADAS enhancement service registration request; a sending unit, configured to: in response to obtaining information about a cloud platform providing an ADAS enhancement service, send the ADAS enhancement service registration request to the cloud platform, the ADAS enhancement service registration request being used for allowing the cloud platform to learn ADAS capability information of the vehicle terminal; and a first receiving unit, configured to: after the ADAS enhancement service is registered with the cloud platform, receive an ADAS enhancement service message that is pushed by the cloud platform and corresponds to the ADAS capability information.

According to some embodiments, a driving assistance processing apparatus may be provided, including: a second receiving unit, configured to receive an ADAS enhancement service registration request sent by a vehicle terminal, the ADAS enhancement service registration request being sent by the vehicle terminal after information about a cloud platform that provides an ADAS enhancement service is obtained; a third obtaining unit, configured to obtain ADAS capability information of the vehicle terminal according to the ADAS enhancement service registration request; and a push unit, configured to push an ADAS enhancement service message corresponding to the ADAS capability information to the vehicle terminal according to the ADAS capability information of the vehicle terminal.

According to some embodiments, a non-transitory computer-readable medium may be provided, storing a computer program, the computer program, when executed by a processor, implementing the driving assistance processing method according to the foregoing embodiment.

According to some embodiments, an electronic device may be provided, including: one or more processors; and a storage apparatus, configured to store one or more programs, the one or more programs, when executed by the one or more processors, causing the one or more processors to implement the driving assistance processing method according to the foregoing embodiment.

According to some embodiments, a computer program product or a computer program may be provided, the computer program product or the computer program including computer instructions, the computer instructions being stored in a non-transitory computer-readable storage medium. A processor of a computer device reads the computer instructions from the non-transitory computer-readable storage medium, and executes the computer instructions, to cause the computer device to perform the driving assistance processing method provided in the foregoing embodiments.

FIG. 1 is a schematic diagram of an application scenario according to some embodiments.

As shown in FIG. 1, in an application scenario of this disclosure, a vehicle terminal may communicate with a cloud platform through a base station 101. The cloud platform may intercommunicate with a high-precision positioning system 102 and implement high-precision positioning of the vehicle terminal by collaborating with the vehicle terminal. The base station 101 may be a 5G base station or may be a 3G or 4G base station or may be a next-generation mobile communication base station. The cloud platform may be a road-side cloud platform or a central cloud platform. The road-side cloud platform is a cloud platform disposed near a road and is only configured to serve a few road sections. With respect to the road-side cloud platform, the central cloud platform is a cloud platform that serves many road sections or all road sections. The service area of the central cloud platform is much larger than that of the road-side cloud platform. The central cloud platform may be disposed at a back end of a core network.

A vehicle terminal may interact with the cloud platform (including the central cloud platform and the road-side cloud platform) through the base station 101 (that is, a mobile communication network) as shown in FIG. 1, and may further interact with the road-side cloud platform through vehicle-to-everything (V2X) communication.

In some embodiments, the vehicle terminal shown in FIG. 1 may be provided with an ADAS function. The ADAS function specifically includes a warning system and a control system. The warning system may include a forward collision warning (FCW) system, a lane departure warning (LDW) system, a blind spot detection (BSD) system, a driver fatigue warning (DFW) system, a tire pressure monitoring system (TPMS), and the like. The control system may include a lane keeping assist (LKA) system, an automated parking system (APS), an autonomous emergency braking (AEB) system, an adaptive cruise control (ACC) system, a pedestrian protection system (PPS), a down-hill assist control (DAC) system, and the like. Certainly, in some embodiments, not all vehicles have the ADAS function. A vehicle with the ADAS function does not necessarily have all the foregoing functions, and may have only part of the ADAS function.

To resolve the problem of a limited sensing range of a conventional ADAS, in some embodiments, a vehicle terminal may generate an ADAS enhancement service registration request. In response to obtaining information about a cloud platform, for example, the cloud platform shown in FIG. 1, providing an ADAS enhancement service, the vehicle terminal may send the generated ADAS enhancement service registration request to the cloud platform. The cloud platform may learn ADAS capability information of the vehicle terminal based on the ADAS enhancement service registration request, and may push an ADAS enhancement service message corresponding to the ADAS capability information of the vehicle terminal to the vehicle terminal.

For example, in response to determining, according to the ADAS capability information of the vehicle terminal, that a target vehicle terminal does not have an FCW capability, the cloud platform may determine, according to obtained location information and traveling status information (for example, a traveling speed and an acceleration) of a plurality of vehicle terminals and road condition information of road sections on which the vehicle terminals travel, whether the target vehicle terminal has a potential collision risk. If it is determined that the target vehicle terminal does have a potential collision risk, the cloud platform may send an FCW warning message to the target vehicle terminal to enhance the ADAS capability of the target vehicle terminal.

In some embodiments, the cloud platform may provide an ADAS enhancement service depending on an artificial intelligence (AI) technology. The AI technology is a theory, method, technology, and application system that uses a digital computer or a machine controlled by the digital computer to simulate, extend, and expand human intelligence, perceive an environment, acquire knowledge, and use knowledge to obtain an optimal result. In other words, AI is a comprehensive technology in computer science. This technology attempts to understand the essence of intelligence and produce a new intelligent machine that can react in a manner similar to human intelligence. AI studies the design principles and implementation methods of various intelligent machines, so that the machines can perceive, infer, and make decisions.

In addition, AI technology is a comprehensive subject, relating to a wide range of fields, and involving both hardware and software techniques. Basic AI technologies generally include technologies such as a sensor, a dedicated AI chip, cloud computing, distributed storage, a big data processing technology, an operating/interaction system, and electromechanical integration. An AI software technology mainly includes fields such as a CV technology, a speech processing technology, a natural language processing technology, and machine learning (ML)/deep learning (DL).

Computer vision (CV) is a science that studies how to use a machine to "see", and furthermore, that uses a camera and a computer to replace human eyes to perform machine vision such as recognition, tracking, and measurement on a target, and further perform graphic processing, so that the computer processes the target into an image more suitable for human eyes to observe, or an image transmitted to an instrument for detection. As a scientific discipline, the CV studies related theories and technologies and attempts to establish an AI system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional object reconstruction, a 3D technology, virtual reality, augmented reality, synchronous positioning, and map construction, and further include biometric feature recognition technologies such as common face recognition and fingerprint recognition.

In combination with this application, both the vehicle terminals and the cloud platform may use technologies such as computer vision and ML/DL in the AI technology to improve the accuracy of ADAS. The vehicle terminals can also implement autonomous driving based on this.

Implementation details of the technical solutions according to some embodiments are described below.

Figure 2:
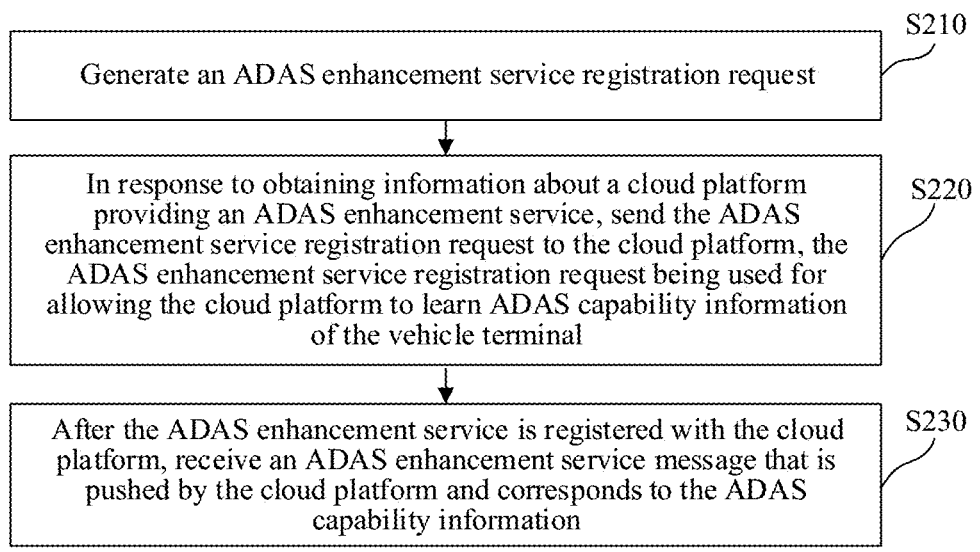
FIG. 2 is a flowchart of a driving assistance processing method according to some embodiments.
Figure 11:
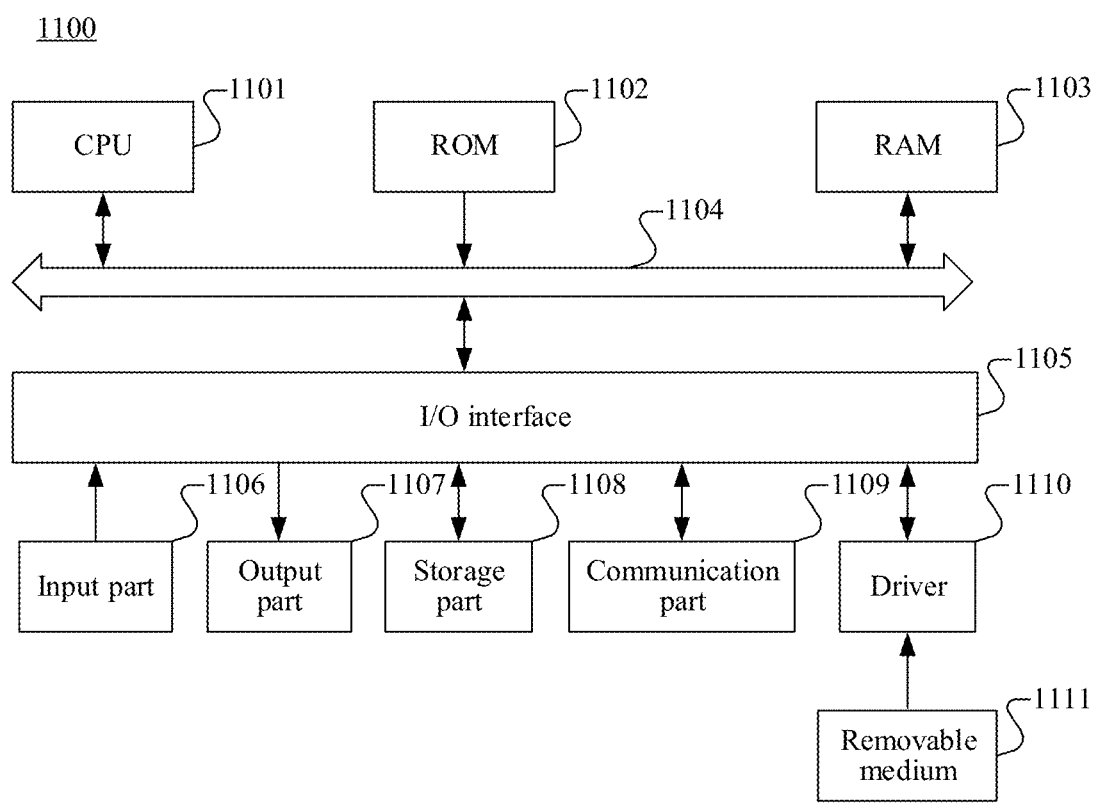
FIG. 11 is a schematic structural diagram of a computer system adapted to implement an electronic device according to some embodiments.

FIG. 2 is a flowchart of a driving assistance processing method according to some embodiments. The driving assistance processing method may be performed by a vehicle terminal. In other words, the method may be performed by an electronic device disposed on or in a vehicle terminal. The electronic device is shown in FIG. 11. Referring to FIG. 2, the driving assistance processing method includes at least operations S210 to S230, which are described below in detail.

In operation S210, an ADAS enhancement service registration request is generated.

In some embodiments, the ADAS enhancement service registration request generated by the vehicle terminal includes identifier information of the vehicle terminal and the ADAS capability information of the vehicle terminal. The ADAS capability information includes at least one of the following information: information about support for various ADAS functions of the vehicle terminal; and information about a sensor equipped on the vehicle terminal. As such, as a technical solution, after the vehicle terminal sends the ADAS enhancement service registration request to the cloud platform, the cloud platform may directly obtain the ADAS capability information of the vehicle terminal according to the registration request.

In some embodiments, the ADAS enhancement service registration request generated by the vehicle terminal includes identifier information of the vehicle terminal. As such, as a technical solution, the ADAS enhancement service registration request does not directly carry the ADAS capability information of the vehicle terminal, and the cloud platform may obtain the ADAS capability information of the vehicle terminal from an application server corresponding to the vehicle terminal according to the identifier information of the vehicle terminal. The application server corresponding to the vehicle terminal may be an original equipment manufacturer (OEM) server.

In operation S220, in response to obtaining information about a cloud platform providing an ADAS enhancement service, send the ADAS enhancement service registration request to the cloud platform, the ADAS enhancement service registration request being used for allowing the cloud platform to learn ADAS capability information of the vehicle terminal.

The generating an ADAS enhancement service registration request in operation S210 may be performed before the information about a cloud platform providing an ADAS enhancement service is obtained or after the information about a cloud platform providing an ADAS enhancement service is obtained, or the ADAS enhancement service registration request may be generated at the same time when the information about a cloud platform providing an ADAS enhancement service is obtained.

In some embodiments, before sending the ADAS enhancement service registration request to the cloud platform, the vehicle terminal needs to first obtain the information about a cloud platform that can provide an ADAS enhancement service, for example, identifier information of the cloud platform or a network address of the cloud platform. Some embodiments provide multiple solutions of obtaining the information about a cloud platform that can provide an ADAS enhancement service, which are specifically as follows:

In some embodiments, the vehicle terminal may receive the information that is configured by the corresponding application server and is about a cloud platform that can provide an ADAS enhancement service. That is, in this embodiment, the application server corresponding to the vehicle terminal may send the information about a cloud platform that can provide an ADAS enhancement service to the vehicle terminal, and the application server may interact with the cloud platform to obtain the information that is configured by the cloud platform and is about a cloud platform that can provide an ADAS enhancement service. The application server corresponding to the vehicle terminal may be an OEM server.

In some embodiments, the vehicle terminal may obtain, from preconfiguration information of the vehicle terminal, the information about a cloud platform that can provide an ADAS enhancement service. That is, in this embodiment, the application server corresponding to the vehicle terminal may preconfigure, in the vehicle terminal through the preconfiguration information, the information about a cloud platform that can provide an ADAS enhancement service. Certainly, the application server may interact with the cloud platform to obtain the information that is configured by the cloud platform and is about a cloud platform that can provide an ADAS enhancement service.

In some embodiments, the vehicle terminal may receive service discovery information pushed by a cloud platform that can provide an ADAS enhancement service, and then obtain, according to the service discovery information, the information about a cloud platform that can provide an ADAS enhancement service. The service discovery information pushed by the cloud platform may include the identifier information of the cloud platform, the network address of the cloud platform, and the like.

In some embodiments, in a case that the cloud platform is a central cloud platform, the vehicle terminal may send the ADAS enhancement service registration request to the central cloud platform through a mobile communication network. In a case that the cloud platform is a road-side cloud platform, the vehicle terminal may send the ADAS enhancement service registration request to the road-side cloud platform through a mobile communication network or V2X.

Continuing to refer to FIG. 2, in operation S230, after the ADAS enhancement service is registered with the cloud platform, an ADAS enhancement service message that is pushed by the cloud platform and corresponds to the ADAS capability information is received.

For example, in response to determining, according to the ADAS capability information of the vehicle terminal, that a target vehicle terminal does not have FCW capabilities, the cloud platform may determine, according to obtained location information and traveling status information (e.g., a traveling speed and an acceleration) of a plurality of vehicle terminals and road condition information of road sections on which the vehicle terminals travel, whether the target vehicle terminal has a potential collision risk. If it is determined that the target vehicle terminal does have a potential collision risk, the cloud platform may send an FCW warning message to the target vehicle terminal to enhance the ADAS capability of the target vehicle terminal.

When registering an ADAS enhancement service with the cloud platform, the vehicle terminal may register only enhancement services for some ADAS functions For example, register only an enhancement service of FCW. In some embodiments, the vehicle terminal may register enhancement services for all ADAS functions.

Figure 3:
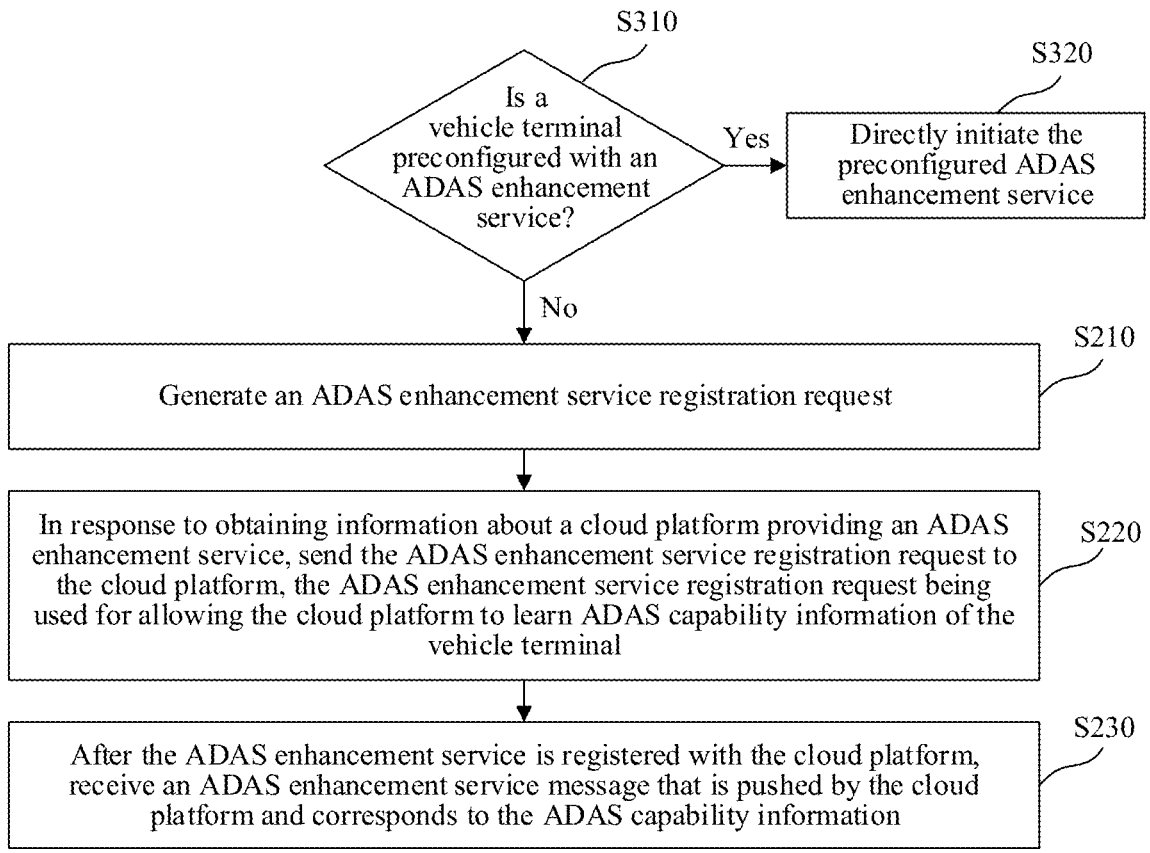
FIG. 3 is a flowchart of a driving assistance processing method according to some embodiments.

Based on the driving assistance processing method shown in FIG. 2, as shown in FIG. 3, the method may further include operations S310 and S320.

In operation S310, whether a vehicle terminal is preconfigured with an ADAS enhancement service is detected. In response to detecting that the vehicle terminal is preconfigured with an ADAS enhancement service, operation S320 is performed. In operation S320, the preconfigured ADAS enhancement service is directly initiated. In response to detecting that the vehicle terminal is not preconfigured with an ADAS enhancement service, the vehicle terminal performs operation S210 (shown in FIG. 2). That is, a registration request is generated with the cloud platform to obtain an ADAS enhancement service.

In some embodiments, initiating the preconfigured ADAS enhancement service may be: in response to detecting, according to a preconfigured initiation condition, that the vehicle terminal meets the initiation condition, and directly initiating the ADAS enhancement service. For example, the ADAS enhancement service may be initiated in response to detecting at least one of the following initiation conditions: an area in which the vehicle terminal is located is a preconfigured geographical area, a road section in which the vehicle terminal is located is a preconfigured road section, a road condition around the vehicle terminal is a preconfigured road condition, and a time of the vehicle terminal is within a preconfigured time period.

After initiating the ADAS enhancement service, the vehicle terminal may receive an ADAS enhancement service message pushed by the cloud platform.

The technical solution described above is from the perspective of a vehicle terminal. The technical solution in described below is from the perspective of a cloud platform shown in FIG. 4.

Figure 4:
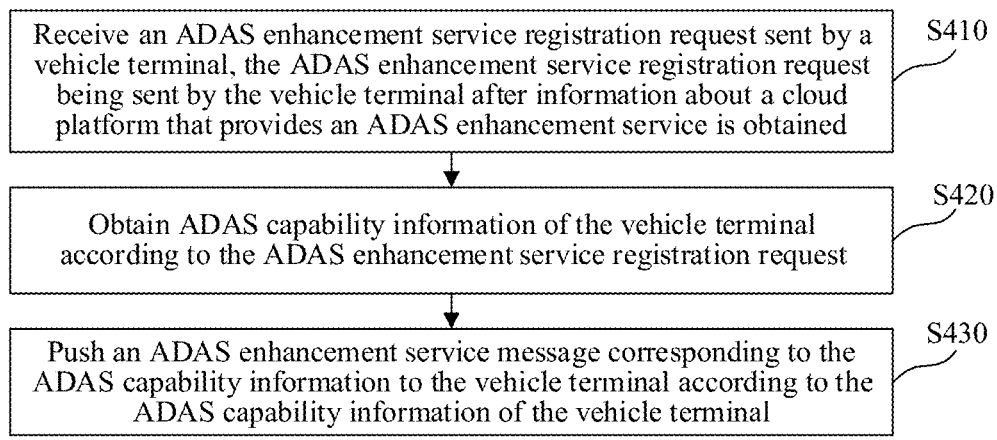
FIG. 4 is a flowchart of a driving assistance processing method according to some embodiments.

FIG. 4 is a flowchart of a driving assistance processing method according to some embodiments The driving assistance processing method may be performed by a cloud platform. The cloud platform may be a road-side cloud platform or a central cloud platform. In other words, the method may be performed by an electronic device disposed on a cloud platform. The electronic device is shown in FIG. 11. Referring to FIG. 4, the driving assistance processing method includes at least operations S410 to S430, which are described below.

In operation S410, an ADAS enhancement service registration request sent by a vehicle terminal is received, the ADAS enhancement service registration request being sent by the vehicle terminal after information about a cloud platform that provides an ADAS enhancement service is obtained.

In some embodiments, in a case that the cloud platform is a central cloud platform, the vehicle terminal may send the ADAS enhancement service registration request to the central cloud platform through a mobile communication network. In a case that the cloud platform is a road-side cloud platform, the vehicle terminal may send the ADAS enhancement service registration request to the road-side cloud platform through a mobile communication network or V2X.

In operation S420, ADAS capability information of the vehicle terminal according to the ADAS enhancement service registration request is obtained.

In some embodiments, the cloud platform may obtain the ADAS capability information of the vehicle terminal from the ADAS enhancement service registration request. In this embodiment, the ADAS enhancement service registration request generated by the vehicle terminal includes identifier information of the vehicle terminal and the ADAS capability information of the vehicle terminal, and the cloud platform may directly obtain the ADAS capability information of the vehicle terminal from the ADAS enhancement service registration request. The ADAS capability information may include at least one of the following information: information about support for various ADAS functions of the vehicle terminal; and information about a sensor equipped on the vehicle terminal.

In some embodiments, the cloud platform may obtain identifier information of the vehicle terminal from the ADAS enhancement service registration request, and obtain the ADAS capability information of the vehicle terminal from an application server corresponding to the vehicle terminal according to the identifier information of the vehicle terminal. That is, in this embodiment, the ADAS enhancement service registration request generated by the vehicle terminal may not include the ADAS capability information of the vehicle terminal but include the identifier information of the vehicle terminal. The application server corresponding to the vehicle terminal may be an OEM server.

Figure 5:
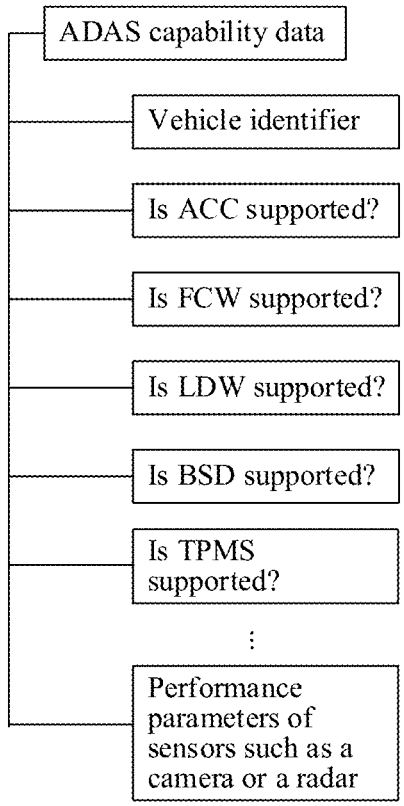
FIG. 5 is a schematic diagram of a format of ADAS capability data according to some embodiments

In some embodiments, the ADAS capability information of the plurality of vehicle terminals obtained by the cloud platform may be from vehicle terminals of different manufacturers, and are different in data formats. Therefore, the cloud platform may convert obtained ADAS capability information of the plurality of vehicle terminals into ADAS capability data in a set format. As shown in FIG. 5, the ADAS capability data in the set format including identifier information of each vehicle terminal and at least one of the following information: information about support for various ADAS functions of the vehicle terminal (for example, whether ACC is supported, whether FCW is supported, whether LDW is supported, whether BSD is supported, and whether a TPMS is supported); and information about a sensor equipped on the vehicle terminal (performance parameters of sensors such as a camera or a radar).

In operation S430, an ADAS enhancement service message corresponding to the ADAS capability information is pushed to the vehicle terminal according to the ADAS capability information of the vehicle terminal.

In some embodiments, a first-type vehicle terminal without a specified ADAS function and a second-type vehicle terminal with the specified ADAS function may be determined according to the ADAS capability information of the vehicle terminals, then an ADAS enhancement service message related to the specified ADAS function is preferentially pushed to the first-type vehicle terminal, and it is determined, according to an indicator requirement of the specified ADAS function, whether to push the ADAS enhancement service message related to the specified ADAS function to the second-type vehicle terminal.

Specifically, for the first-type vehicle terminal without the specified ADAS function, the ADAS enhancement service message related to the specified ADAS function is preferentially pushed to the first-type vehicle terminal, so that it can be ensured that a vehicle terminal of this type can obtain information related to an ADAS, thereby ensuring the safety. It is determined, according to an indicator requirement of the specified ADAS function, whether to push the ADAS enhancement service message related to the specified ADAS function to the second-type vehicle terminal, so that in response to determining that it is not necessary to push the ADAS enhancement service message related to the specified ADAS function to the second-type vehicle terminal, resources occupied to send an ADAS enhancement service message can be reduced, and in response to determining that it is necessary to push the ADAS enhancement service message related to the specified ADAS function to the second-type vehicle terminal, the safety of the second-type vehicle terminal can be further ensured by using an ADAS enhancement service message.

Implementation details of the technical solution according to some embodiments are described below in detail with reference to FIG. 6 to FIG. 8.

Figure 6:
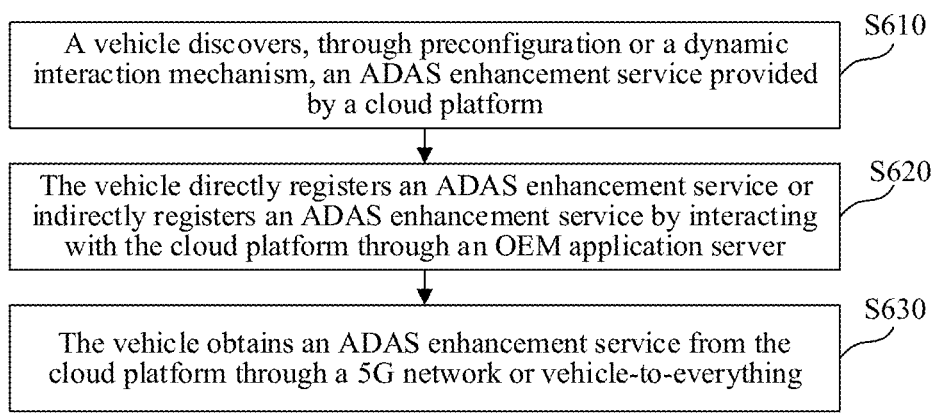
FIG. 6 is a flowchart of a driving assistance processing method according to some embodiments
Figure 7:
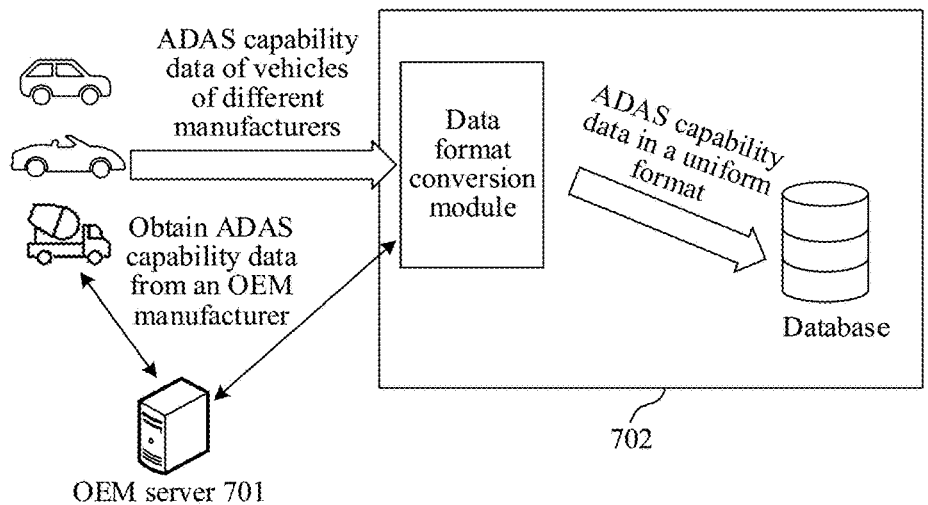
FIG. 7 is a schematic diagram of a system architecture according to some embodiments.

As shown in FIG. 6, a driving assistance processing method according to some embodiments includes the following operations:

In operation S610, a vehicle discovers, through preconfiguration or a dynamic interaction mechanism, an ADAS enhancement service provided by a cloud platform.

In some embodiments, an OEM server may preconfigure, in the vehicle terminal, the information about a cloud platform that can provide an ADAS enhancement service, or an OEM server may send, through dynamic interaction, the information about a cloud platform that can provide an ADAS enhancement service to a vehicle, so that the vehicle discovers an ADAS enhancement service provided by the cloud platform. The OEM server may interact with the cloud platform to obtain the information that is configured by the cloud platform and is about a cloud platform that can provide an ADAS enhancement service.

In some embodiments, the cloud platform may be a central cloud platform with a high deployment level or may be an edge cloud (that is, a road-side cloud platform) on a specific road section. To implement ADAS enhancement based on a 5G network (or certainly, a next-generation wireless communication network), the cloud platform needs to monitor a road environment around vehicles in real time through the 5G network, determines a potential safety risk according to information such as distances between front and rear vehicles, speeds, and lanes, and provides an ADAS enhancement service based on the potential safety risk.

In some embodiments, it is assumed that the vehicles have a 5G communication capability (that is, the vehicles may be connected to a 5G network through 5G T-Box, or certainly, the capability may be a next-generation wireless communication capability). Different vehicles may have different ADAS capabilities. For example, ADAS capabilities of the vehicles are different because of different brand manufacturers or are different because of different configurations of the same brand manufacturer. The premise for the cloud platform to provide an ADAS enhancement service is that ADAS capability information of a plurality of vehicles can be obtained through a network. Therefore, the vehicles need to register with the cloud platform.

In operation S620, the vehicle directly registers an ADAS enhancement service or indirectly registers an ADAS enhancement service by interacting with the cloud platform through an OEM server.

Specifically, the vehicle may directly send a registration request including vehicle identifier information and ADAS capability information of the vehicle to the cloud platform to register with the cloud platform. In some embodiments, the vehicle may send a registration request including only vehicle identifier information to the cloud platform, and the cloud platform may obtain ADAS capability information of the vehicle from the OEM server according to the vehicle identifier information.

In addition, because vehicles of various manufacturers have different configurations, data formats may be different when different vehicles register with the cloud platform. Therefore, as shown in FIG. 7, a data format conversion module is disposed in a functional entity 702 (the functional entity may be disposed in the cloud platform) of an ADAS enhancement service. The data format conversion module is configured to convert ADAS capability data directly obtained from the vehicles and ADAS capability data obtained from the OEM server 701 into capability data in the same format for subsequent storage in a database. The format of the converted capability data may be shown in FIG. 5.

In operation S630, the vehicle obtains an ADAS enhancement service from the cloud platform through a 5G network or V2X.

In some embodiments, in a case that the cloud platform is a central cloud platform, the vehicle terminal may obtain the ADAS enhancement service from the central cloud platform through a mobile communication network. In a case that the cloud platform is a road-side cloud platform, the vehicle terminal may obtain the ADAS enhancement service from the road-side cloud platform through a mobile communication network or V2X.

Figure 8:
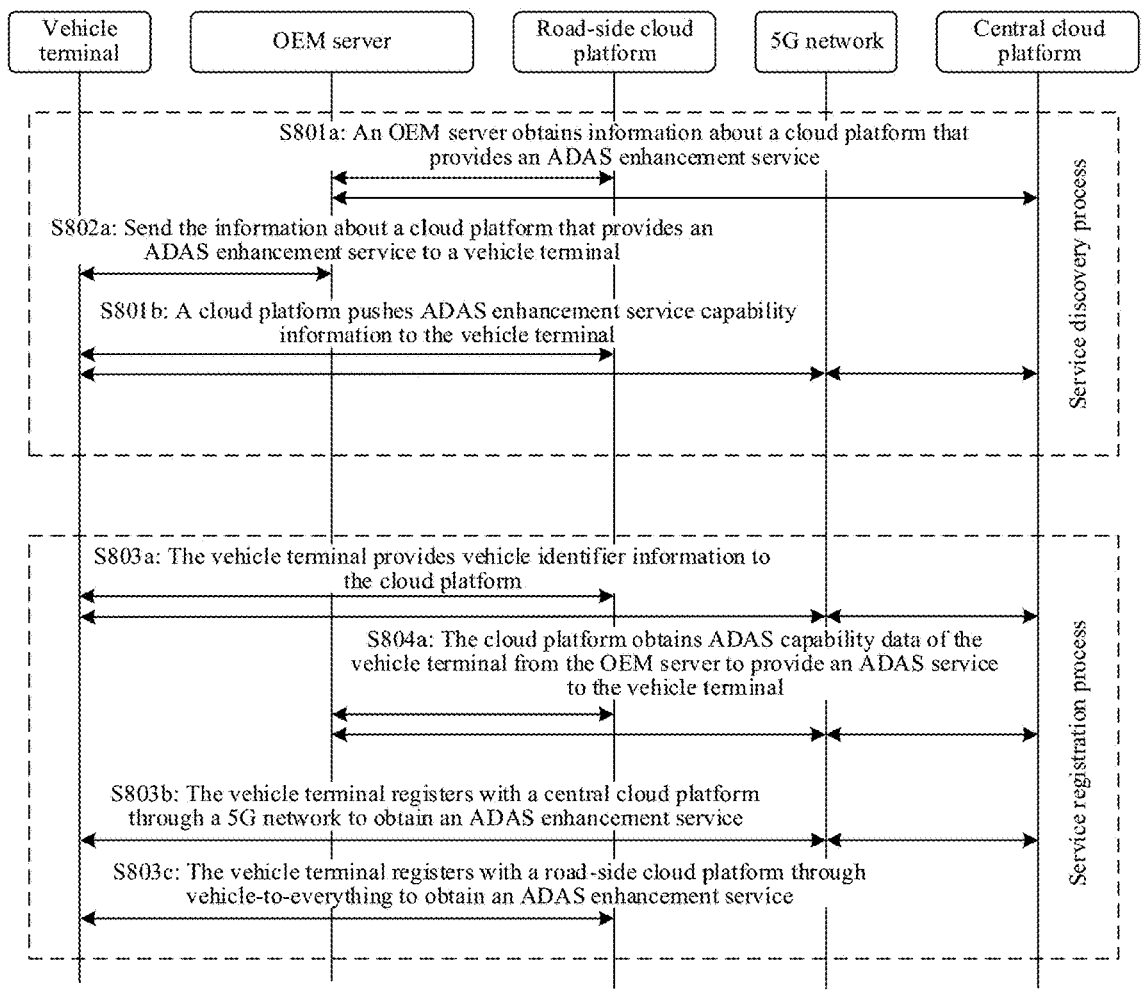
FIG. 8 is an interaction diagram of a driving assistance processing method according some embodiments.

Referring to FIG. 8, an interaction procedure, according to some embodiments, mainly includes a service discovery process and a service registration process. Two processing modes may be used in the service discovery process. One processing mode is shown by operation S801*a* and operation S802*a*. That is, in operation S801*a*, the OEM server interacts with the cloud platform (the road-side cloud platform or the central cloud platform) to obtain the information about a cloud platform that can provide an ADAS enhancement service, to implement beforehand discovery of an ADAS enhancement service capability. In operation S802*a*, the OEM server sends the information about a cloud platform that provides an ADAS enhancement service to a vehicle terminal for the vehicle terminal to perform service discovery.

Another processing mode of the service discovery process is shown in operation S801*b*. That is, the cloud platform (the road-side cloud platform or the central cloud platform) directly pushes the ADAS enhancement service capability information to the vehicle terminal.

Continuing to refer to FIG. 8, one mode of the service registration process is shown in operation S803*a* and operation S804*a*. In operation S803*a*, the vehicle terminal provides vehicle identifier information to the cloud platform (the road-side cloud platform or the central cloud platform). In operation S804*a*, the cloud platform obtains ADAS capability data of the vehicle terminal from the OEM server to provide an ADAS service to the vehicle terminal. That is, in operation S803*a* and operation S804*a*, instead of directly registering with the cloud platform, the vehicle terminal only provides an identifier of the vehicle terminal, and the cloud platform interacts with the OEM server to obtain the ADAS capability information of the vehicle terminal.

Another processing mode of the service registration process is shown in operation S803*b*. That is, the vehicle terminal registers with a central cloud platform through a 5G network to obtain an ADAS enhancement service. In some embodiments, as shown in S803*c*, the vehicle terminal registers with a road-side cloud platform through V2X (certainly, or a 5G network) to obtain an ADAS enhancement service.

In some embodiments, in a case that the vehicle terminal has a preconfiguration of an ADAS enhancement service, the vehicle terminal may directly initiate an ADAS enhancement service, and does not need to perform the service discovery process and the service registration process shown in FIG. 8. The preconfigured ADAS enhancement service may be initiated in a mode such as a geographical area, a road section, a surrounding road condition, or a payment period. In a case that the vehicle terminal has no preconfigured ADAS enhancement service, the service discovery process and the service registration process shown in FIG. 8 are performed.

According to some embodiments, a cloud platform may combine various information (for example, ADAS capability information of a plurality of vehicle terminals, and road condition information of a road section on which the vehicle terminals travel) to push an ADAS enhancement service message corresponding to ADAS capability information of a vehicle terminal to the vehicle terminal, to resolve the problem of a limited sensing range of a conventional single-vehicle ADAS, thereby effectively enhancing the safety of the ADAS.

The following describes an apparatus according to some embodiments, and the apparatus embodiments may be used for performing the driving assistance processing method in the foregoing embodiments. For details not disclosed in the apparatus embodiments, refer to the foregoing embodiments of the driving assistance processing method of this disclosure.

Figure 9:
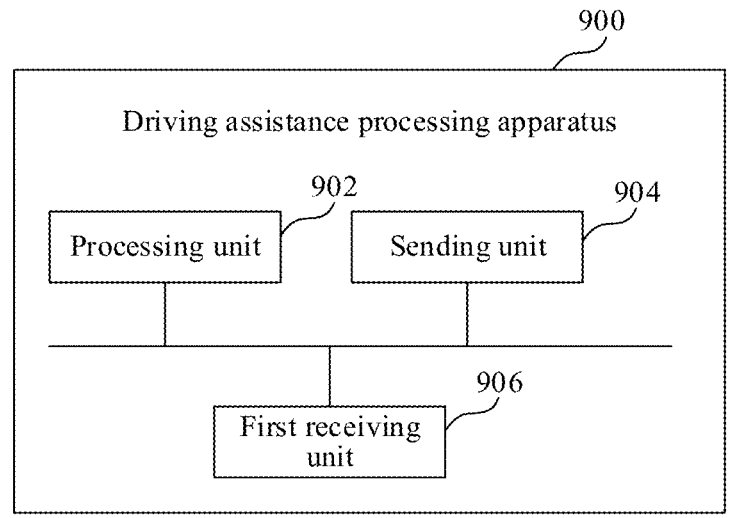
FIG. 9 is a block diagram of a driving assistance processing apparatus according to some embodiments.

FIG. 9 is a block diagram of a driving assistance processing apparatus according to some embodiments. The driving assistance processing apparatus may be disposed in a vehicle terminal.

Referring to FIG. 9, a driving assistance processing apparatus 900 according to some embodiments includes a processing unit 902, a sending unit 904, and a first receiving unit 906.

The processing unit 902 is configured to generate an ADAS enhancement service registration request. The sending unit 904 is configured to: in response to obtaining information about a cloud platform providing an ADAS enhancement service, send the ADAS enhancement service registration request to the cloud platform, the ADAS enhancement service registration request being used for allowing the cloud platform to learn ADAS capability information of the vehicle terminal. The first receiving unit 906 is configured to: after the ADAS enhancement service is registered with the cloud platform, receive an ADAS enhancement service message that is pushed by the cloud platform and corresponds to the ADAS capability information.

In some embodiments, based on the foregoing solution, the driving assistance processing apparatus 900 further includes: a first obtaining unit, configured to: before the sending unit sends the ADAS enhancement service registration request to the cloud platform, receive information that is configured by an application server corresponding to the vehicle terminal and is about a cloud platform that can provide an ADAS enhancement service, the information about a cloud platform that can provide an ADAS enhancement service is obtained by the cloud platform by interacting with the application server and is configured in the application server; or obtain, from preconfiguration information of the vehicle terminal, information about a cloud platform that can provide an ADAS enhancement service, the preconfiguration information being preconfigured in the vehicle terminal by the application server corresponding to the vehicle terminal.

In some embodiments, based on the foregoing solution, the driving assistance processing apparatus 900 further includes: a second obtaining unit, configured to: before the sending unit sends the ADAS enhancement service registration request to the cloud platform, receive service discovery information pushed by a cloud platform that can provide an ADAS enhancement service; and obtain, according to the service discovery information, information about a cloud platform that can provide an ADAS enhancement service.

In some embodiments, based on the foregoing solution, the sending unit 904 is configured to: send the ADAS enhancement service registration request to the cloud platform to a central cloud platform through a mobile communication network; or send the ADAS enhancement service registration request to a road-side cloud platform through a mobile communication network or through V2X.

In some embodiments, based on the foregoing solution, the ADAS enhancement service registration request includes identifier information of the vehicle terminal and the ADAS capability information of the vehicle terminal, and the ADAS capability information includes at least one of the following information: information about support for various ADAS functions of the vehicle terminal; and information about a sensor equipped on the vehicle terminal.

In some embodiments, based on the foregoing solution, the ADAS enhancement service registration request includes identifier information of the vehicle terminal, and the ADAS enhancement service registration request is used for allowing the cloud platform to obtain the ADAS capability information of the vehicle terminal from an application server corresponding to the vehicle terminal according to the identifier information of the vehicle terminal.

In some embodiments, based on the foregoing solution, the processing unit 902 is further configured to: in response to detecting that the vehicle terminal is preconfigured with an ADAS enhancement service, directly initiate the preconfigured ADAS enhancement service; and in response to detecting that the vehicle terminal is not configured with an ADAS enhancement service, perform a process of generating the ADAS enhancement service registration request.

In some embodiments, based on the foregoing solution, the processing unit 902 is configured to: in response to detecting, according to a preconfigured initiation condition, that the vehicle terminal meets the initiation condition, directly initiate the ADAS enhancement service, where the initiation condition includes at least one of the following: an area in which the vehicle terminal is located is a preconfigured geographical area, a road section in which the vehicle terminal is located is a preconfigured road section, a road condition around the vehicle terminal is a preconfigured road condition, and a time of the vehicle terminal is within a preconfigured time period.

Figure 10:
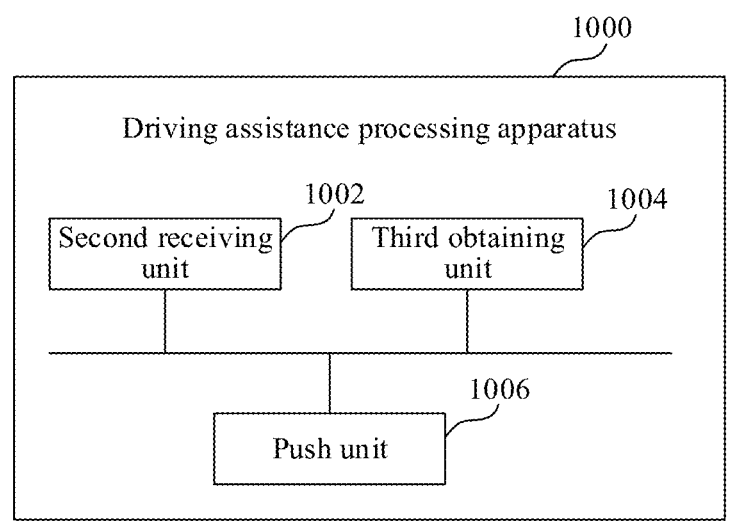
FIG. 10 is a block diagram of a driving assistance processing apparatus according to some embodiments.

FIG. 10 is a block diagram of a driving assistance processing apparatus according to some embodiments. The driving assistance processing apparatus may be disposed in a cloud platform.

Referring to FIG. 10, a driving assistance processing apparatus 1000 according to some embodiments includes a second receiving unit 1002, a third obtaining unit 1004, and a push unit 1006.

The second receiving unit 1002 is configured to receive an ADAS enhancement service registration request sent by a vehicle terminal, the ADAS enhancement service registration request being sent by the vehicle terminal after information about a cloud platform that provides an ADAS enhancement service is obtained. The third obtaining unit 1004 is configured to obtain ADAS capability information of the vehicle terminal according to the ADAS enhancement service registration request. The push unit 1006 is configured to push an ADAS enhancement service message corresponding to the ADAS capability information to the vehicle terminal according to the ADAS capability information of the vehicle terminal.

In some embodiments, based on the foregoing solution, the third obtaining unit 1004 is configured to: obtain the ADAS capability information of the vehicle terminal from the ADAS enhancement service registration request; or obtain identifier information of the vehicle terminal from the ADAS enhancement service registration request, and obtain the ADAS capability information of the vehicle terminal from an application server corresponding to the vehicle terminal according to the identifier information of the vehicle terminal.

In some embodiments, based on the foregoing solution, the driving assistance processing apparatus 1000 further includes: a format conversion unit, configured to convert obtained ADAS capability information of a plurality of vehicle terminals into ADAS capability data in a set format, the ADAS capability data in the set format including identifier information of each vehicle terminal and at least one of the following information: information about support for various ADAS functions of the vehicle terminal; and information about a sensor equipped on the vehicle terminal.

In some embodiments, based on the foregoing solution, the push unit 1006 is configured to: determine a first-type vehicle terminal without a specified ADAS function and a second-type vehicle terminal with the specified ADAS function according to the ADAS capability information of the vehicle terminals; preferentially push an ADAS enhancement service message related to the specified ADAS function to the first-type vehicle terminal; and determine, according to an indicator requirement of the specified ADAS function, whether to push the ADAS enhancement service message related to the specified ADAS function to the second-type vehicle terminal.

According to some embodiments, after generating an ADAS enhancement service registration request and obtaining information about a cloud platform providing an ADAS enhancement service, a vehicle terminal sends the ADAS enhancement service registration request to a cloud platform, and reports ADAS capability information of the vehicle terminal to the cloud platform, so that a cloud platform may combine various information (for ADAS capability information of a plurality of vehicle terminals, and road condition information of a road section on which the vehicle terminals travel) to push an ADAS enhancement service message corresponding to ADAS capability information of a vehicle terminal to the vehicle terminal, to resolve the problem of a limited sensing range of a conventional single-vehicle ADAS, thereby effectively enhancing the safety of the ADAS.

FIG. 11 is a schematic structural diagram of a computer system adapted to implement an electronic device according to some embodiments.

A computer system 1100 of the electronic device shown in FIG. 11 is merely an example, and does not constitute any limitation on functions and use ranges of various embodiments.

As shown in FIG. 11, the computer system 1100 includes a central processing unit (CPU) 1101, which may perform various suitable actions and processing based on a program stored in a read-only memory (ROM) 1102 or a program loaded from a storage part 1108 into a random access memory (RAM) 1103, for example, perform the method described in the foregoing embodiments. The RAM 1103 further stores various programs and data required for system operations. The CPU 1101, the ROM 1102, and the RAM 1103 are connected to each other through a bus 1104. An input/output (I/O) interface 1105 is also connected to the bus 1104.

The following components are connected to the I/O interface 1105: an input part 1106 including a keyboard, a mouse, or the like, an output part 1107 including a cathode ray tube (CRT), a liquid crystal display (LCD), a speaker, or the like, a storage part 1108 including a hard disk, or the like, and a communication part 1109 including a network interface card such as a local area network (LAN) card or a modem. The communication part 1109 performs communication processing by using a network such as the Internet. A driver 1110 is also connected to the I/O interface 1105 as required. A removable medium 1111, such as a magnetic disk, an optical disc, a magneto-optical disk, or a semiconductor memory, is mounted on the driver 1110 as required, so that a computer program read from the removable medium is installed into the storage part 1108 as required.

Particularly, according to some embodiments, the processes described in the foregoing by referring to the flowcharts may be implemented as computer software programs. For example, some embodiments include a computer program product. The computer program product includes a computer program stored in a non-transitory computer-readable medium. The computer program includes a computer program used for performing a method shown in the flowchart. In such an embodiment, the computer program may be downloaded and installed from a network through the communication part 1109, and/or installed from the removable medium 1111. When the computer program is executed by the CPU 1101, the various functions defined in the system of this disclosure are executed.

The non-transitory computer-readable medium shown in various embodiments may be a computer-readable signal medium or a computer-readable storage medium or any combination thereof. The non-transitory computer-readable storage medium may be, for example, but is not limited to, an electric, magnetic, optical, electromagnetic, infrared, or semi-conductive system, apparatus, or component, or any combination thereof. A more specific example of the non-transitory computer-readable storage medium may include but is not limited to: an electrical connection having one or more wires, a portable computer magnetic disk, a hard disk, a RAM, a ROM, an erasable programmable read-only memory (EPROM), a flash memory, an optical fiber, a compact disc read-only memory (CD-ROM), an optical storage device, a magnetic storage device, or any appropriate combination thereof. In some embodiments, the non-transitory computer-readable storage medium may be any tangible medium including or storing a program, and the program may be used by or in combination with an instruction execution system, apparatus, or device. In some embodiments, the computer-readable signal medium may include a data signal transmitted in a baseband or as part of a carrier, and stores a computer-readable computer program. The propagated data signal may be in a plurality of forms, including, but not limited to, an electromagnetic signal, an optical signal, or any appropriate combination thereof. The computer-readable signal medium may be further any computer-readable medium in addition to a non-transitory computer-readable storage medium. The computer-readable medium may send, propagate, or transmit a program that is used by or used in combination with an instruction execution system, apparatus, or device. The computer program included in the non-transitory computer-readable medium may be transmitted by using any suitable medium, including but not limited to: a wireless medium, a wire, or the like, or any suitable combination thereof.

The flowcharts and block diagrams in the accompanying drawings illustrate possible system architectures, functions, and operations that may be implemented by a system, a method, and a computer program product according to various embodiments. Each box in a flowchart or a block diagram may represent a module, a program segment, or a part of code. The module, the program segment, or the part of code includes one or more executable instructions used for implementing specified logic functions. In some implementations used as substitutes, functions marked in boxes may alternatively occur in a sequence different from that marked in an accompanying drawing. For example, two boxes shown in succession may actually be performed basically in parallel, and sometimes the two boxes may be performed in a reverse sequence. This is determined by a related function. Each block in the block diagram or the flowchart, and a combination of blocks in the block diagram or the flowchart may be implemented by using a dedicated hardware-based system that performs a specified function or operation, or may be implemented by using a combination of dedicated hardware and computer instructions.

Related units described in various embodiments may be implemented in a software manner, or may be implemented in a hardware manner, and the unit described can also be set in a processor. Names of these units do not constitute a limitation on the units in a case.

According to another aspect, this disclosure further provides a non-transitory computer-readable medium. The non-transitory computer-readable medium may be included in the electronic device described in the foregoing embodiments, or may exist alone and is not assembled in the electronic device. The non-transitory computer-readable medium carries one or more programs, the one or more programs, when executed by the electronic device, causing the electronic device to implement the method described in the foregoing embodiments.

Although several modules or units of a device for action execution are mentioned in the foregoing detailed descriptions, the division is not mandatory. Actually, according to the implementations of some embodiments, the features and functions of two or more modules or units described above may be specified in one module or unit. Conversely, the features and functions of one module or unit described above may be further divided into a plurality of modules or units to be embodied.

Through the description of the foregoing embodiments, a person skilled in the art can easily understand that the exemplary implementations described herein may be implemented by software, or may be implemented by combining software with necessary hardware. Therefore, the technical solutions according to some embodiments may be implemented in a form of a software product. The software product may be stored in a non-volatile storage medium (which may be a CD-ROM, a USB flash drive, a removable hard disk, or the like) or on a network, including several instructions for instructing a computing device (which may be a PC, a server, a touch terminal, a network device, or the like) to perform the methods according to some embodiments.

After considering the specification and practicing the implementations of this disclosure, a person skilled in the art may easily conceive of other implementations of this disclosure. This disclosure is intended to cover any variation, use, or adaptive change of this disclosure. These variations, uses, or adaptive changes follow the general principles of this disclosure and include common general knowledge or common technical means in the art that are not disclosed in this disclosure.

This disclosure is not limited to the precise structures described above and shown in the accompanying drawings, and various modifications and changes can be made without departing from the scope of this disclosure. The scope of this disclosure is subject only to the appended claims.

What is claimed is:

1. A driving assistance processing method, performed by an electronic device disposed on a vehicle terminal, and comprising:
    generating an advanced driving assistance system (ADAS) enhancement service registration request including ADAS capability information of the vehicle terminal;
    receiving information about a cloud platform, the information provided by an application server that corresponds to the vehicle terminal through an interaction between the cloud platform and the application server;
    based on the information about the cloud platform that provides an ADAS enhancement service, sending the ADAS enhancement service registration request to the cloud platform, the ADAS enhancement service registration request allowing the cloud platform to learn about the ADAS capability information of the vehicle terminal; and
    receiving an ADAS enhancement service message from the cloud platform and corresponds to the ADAS capability information,
    wherein a vehicle in which the vehicle terminal is installed is autonomously controlled using the ADAS capability information.

2. The driving assistance processing method according to claim 1, wherein before the sending the ADAS enhancement service registration request, the driving assistance processing method further comprises:
    obtaining, from preconfiguration information of the vehicle terminal, the information about the cloud platform, the preconfiguration information being preconfigured in the vehicle terminal by an application server corresponding to the vehicle terminal.

3. The driving assistance processing method according to claim 1, wherein before the sending the ADAS enhancement service registration request, the driving assistance processing method further comprises:
    receiving service discovery information from the cloud platform; and
    obtaining, according to the service discovery information, the information about the cloud platform.

4. The driving assistance processing method according to claim 1, wherein the cloud platform is a central cloud platform, and the ADAS enhancement service registration request is sent to the central cloud platform through a mobile communication network.

5. The driving assistance processing method according to claim 1, wherein the cloud platform is a road-side cloud platform, and the ADAS enhancement service registration request is sent to the road-side cloud platform through a mobile communication network or through a vehicle-to-everything (V2X).

6. The driving assistance processing method according to claim 1, wherein the ADAS enhancement service registration request comprises identifier information of the vehicle terminal and the ADAS capability information of the vehicle terminal, and the ADAS capability information comprises at least one of:
    information about support for various ADAS functions of the vehicle terminal; and
    information about a sensor equipped on the vehicle terminal.

7. The driving assistance processing method according to claim 1, wherein the ADAS enhancement service registration request comprises identifier information of the vehicle terminal and enables the cloud platform to obtain the ADAS capability information of the vehicle terminal from an application server corresponding to the vehicle terminal according to the identifier information of the vehicle terminal.

8. The driving assistance processing method according to any one of claim 1, wherein before the generating, the driving assistance processing method further comprises:
    detecting if the vehicle terminal is preconfigured with the ADAS enhancement service;
    based on detecting that the vehicle terminal is preconfigured with the ADAS enhancement service, initiating a preconfigured ADAS enhancement service; and
    based on detecting that the vehicle terminal is not preconfigured with the ADAS enhancement service, generating the ADAS enhancement service registration request.

9. The driving assistance processing method according to claim 8, wherein the initiating comprises:
    detecting, according to a preconfigured initiation condition, if the vehicle terminal meets an initiation condition, and
    based on detecting that the vehicle terminal meets the initiation condition, initiating the ADAS enhancement service,
    wherein the initiation condition comprises at least one of: an area in which the vehicle terminal is located is a preconfigured geographical area, a road section in which the vehicle terminal is located is a preconfigured road section, a road condition around the vehicle terminal is a preconfigured road condition, and a time of the vehicle terminal is within a preconfigured time period.

10. A driving assistance processing apparatus, comprising:
 at least one memory configured to store program code; and
 at least one processor configured to read the program code and operate as instructed by the program code, the program code comprising:
  generating code configured to cause at least one of the at least one processor to generate an advanced driving assistance system (ADAS) enhancement service registration request including ADAS capability information of a vehicle terminal;
  receiving code configured to cause at least one of the at least one processor to receive information about a cloud platform, the information provided by an application server that corresponds to the vehicle terminal through an interaction between the cloud platform and the application server;
  sending code configured to cause at least one of the at least one processor to, based on the information about the cloud platform that provides the ADAS enhancement service, send the ADAS enhancement service registration request to the cloud platform, the ADAS enhancement service registration request allowing the cloud platform to learn about the ADAS capability information of the vehicle terminal; and
  first receiving code configured to cause at least one of the at least one processor to receive an ADAS enhancement service message from the cloud platform and corresponds to the ADAS capability information,
  wherein a vehicle in which the vehicle terminal is installed is autotinmtisly controlled using the ADAS capability information.

11. The driving assistance processing apparatus according to claim 10, wherein the driving assistance processing apparatus further comprises:
 first obtaining code configured to cause at least one of the at least one processor to obtain, from preconfiguration information of the vehicle terminal, the information about the cloud platform, the preconfiguration information being preconfigured in the vehicle terminal by an application server corresponding to the vehicle terminal.

12. The driving assistance processing apparatus according to claim 10, wherein the driving assistance processing apparatus further comprises:
 second receiving code configured to cause at least one of the at least one processor to receive service discovery information from the cloud platform; and
 second obtaining code configured to cause at least one of the at least one processor to obtain the information about the cloud platform.

13. The driving assistance processing apparatus according to claim 10, wherein the driving assistance processing apparatus further comprises:
 detecting code configured to cause at least one of the at least one processor to detect if the vehicle terminal is preconfigured with the ADAS enhancement service, and performing the generating code based on detecting that the vehicle terminal is not preconfigured with the ADAS enhancement service; and
 initiating code configured to cause at least one of the at least one processor to initiate the preconfigured ADAS enhancement service, based on detecting that the vehicle terminal is preconfigured with the ADAS enhancement service.

14. A non-transitory computer-readable medium, storing a computer code that, when executed by at least one processor, causes the at least one processor to at least:
 generate an advanced driving assistance system (ADAS) enhancement service registration request including ADAS capability information of a vehicle terminal;
 receive information about a cloud platform, the information provided by an application server that corresponds to the vehicle terminal through an interaction between the cloud platform and the application server;
 based on the information about the cloud platform that provides an ADAS enhancement service, send the ADAS enhancement service registration request to the cloud platform, the ADAS enhancement service registration request allowing the cloud platform to learn about the ADAS capability information of a vehicle terminal; and
 receive an ADAS enhancement service message from the cloud platform and corresponds to the ADAS capability information,
 wherein a vehicle in which the vehicle terminal is installed is autonomously controlled using the A DAS capability information.

15. The non-transitory computer-readable medium according to claim 14, storing the computer code that, when executed by the at least one processor, further causes the at least one processor to at least obtain, from preconfiguration information of the vehicle terminal, the information about the cloud platform, the preconfiguration information being preconfigured in the vehicle terminal by an application server corresponding to the vehicle terminal.

16. The non-transitory computer-readable medium according to claim 14, storing the computer code that, when executed by the at least one processor, further causes the at least one processor to at least:
 receive service discovery information from the cloud platform; and
 obtain, according to the service discovery information, the information about the cloud platform.

17. The non-transitory computer-readable medium according to claim 14, storing the computer code that, when executed by the at least one processor, further causes the at least one processor to at least:
 detect if the vehicle terminal is preconfigured with the ADAS enhancement service, and generate the ADAS enhancement service registration request based on detecting that the vehicle terminal is not preconfigured with the ADAS enhancement service; and
 initiate a preconfigured ADAS enhancement service, based on detecting that the vehicle terminal is preconfigured with the ADAS enhancement service.

* * * * *